United States Patent [19]

Gennesseaux

[11] Patent Number: 5,165,668
[45] Date of Patent: Nov. 24, 1992

[54] HYDRAULIC VIBRATION-FREE COUPLERS AND IN DAMPING ASSEMBLIES EQUIPPED WITH SUCH COUPLERS

[75] Inventor: André Gennesseaux, Chalette sur Loing, France

[73] Assignee: Hutchinson, France

[21] Appl. No.: 767,683

[22] Filed: Sep. 30, 1991

[30] Foreign Application Priority Data

Oct. 1, 1990 [FR] France ................. 90 12069

[51] Int. Cl.⁵ .............................................. F16M 1/00
[52] U.S. Cl. ............................ 267/140.15; 267/140.12
[58] Field of Search ............. 267/140.1 AE, 140.1 E, 267/140.1 C, 140.1 A; 188/267; 248/550, 562, 636

[56] References Cited

U.S. PATENT DOCUMENTS

| | | |
|---|---|---|
| 4,650,170 | 3/1987 | Fukushima . |
| 4,678,203 | 7/1987 | Rohner et al. . |
| 4,793,599 | 12/1988 | Ishioka . |
| 4,793,600 | 12/1988 | Kojima ..................... 267/140.1 AE |
| 5,060,919 | 10/1991 | Takano et al. ............ 267/140.1 AE |
| 5,116,029 | 5/1992 | Gennesseaux ............ 267/140.1 AE |

*Primary Examiner*—Robert J. Oberleitner
*Assistant Examiner*—Chris Schwartz
*Attorney, Agent, or Firm*—Larson and Taylor

[57] ABSTRACT

A hydraulic vibration-free coupler comprises an inner tubular strength member (1), an outer tubular strength member (2) and an intermediate body (3) made of elastomer defining fluid-tight chambers connected to each other by restricted passages (9). Natural vibrations are actively attenuated by artificially imposing appropriate vibrations to a magnetic ring (7) which moves freely in all possible transverse directions, but not axially, by excitation of electrical coils (5) circumferentially distributed around the ring on the inside of the outer tubular strength member (2). This is done along one or both of two separate diametral directions E and F.

17 Claims, 2 Drawing Sheets

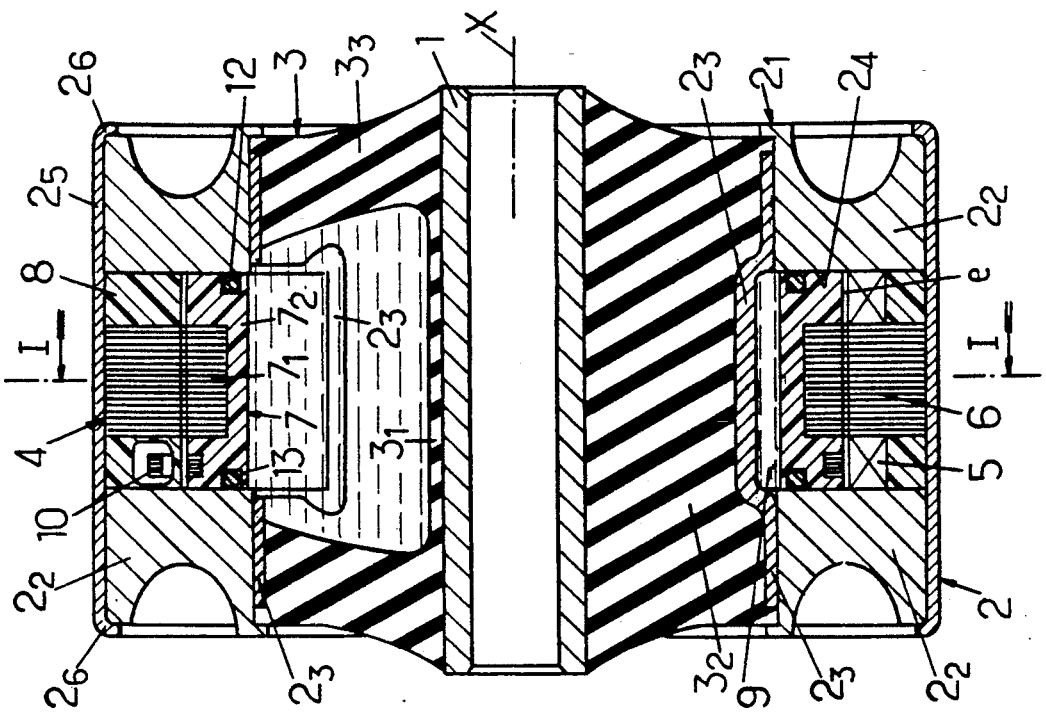
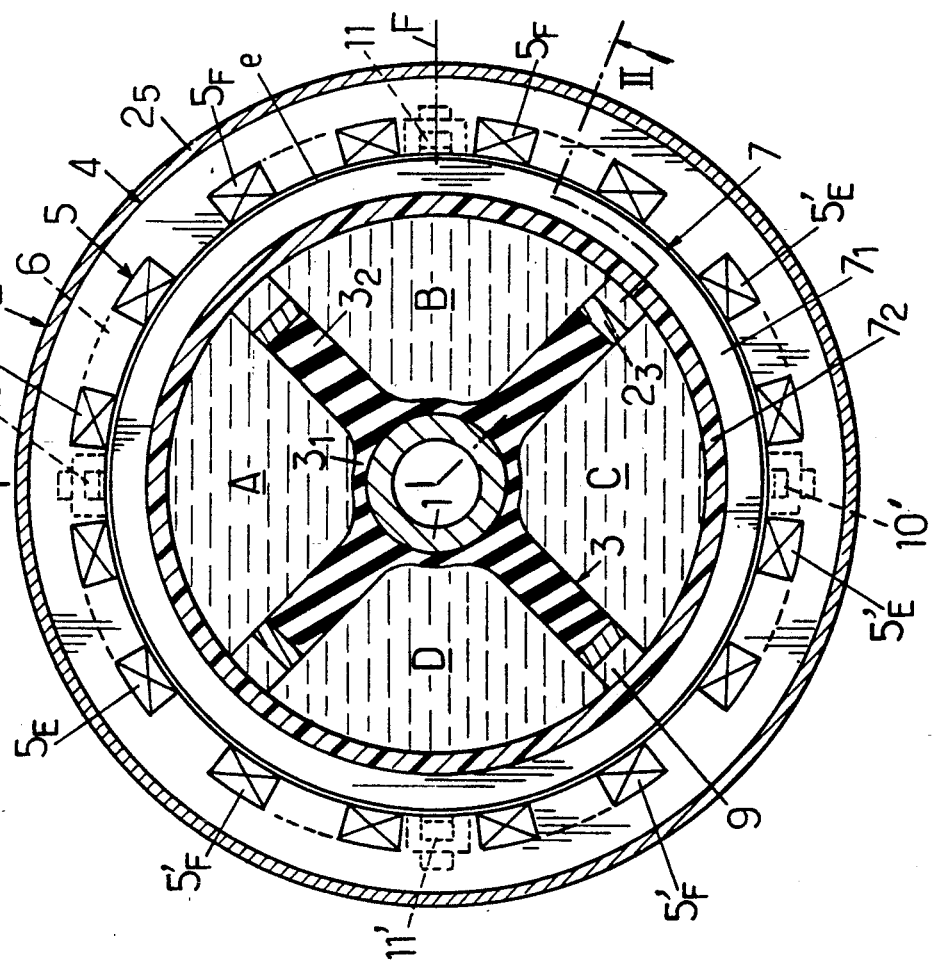

HYDRAULIC VIBRATION-FREE COUPLERS AND IN DAMPING ASSEMBLIES EQUIPPED WITH SUCH COUPLERS

FIELD OF THE INVENTION

The invention relates to hydraulic vibration preventing couplers or mounts intended to be interposed, between two rigid elements such as a vehicle chassis and the engine or a suspension assembly of this vehicle for purposes of damping and linking and even supporting.

It also concerns damping devices or assemblies equipped with such couplers.

BACKGROUND OF THE INVENTION

It relates more particularly to cases in which the couplers in question comprise:

two tubular rigid strength members or frames surrounding each other, and preferably of revolution and coaxial at least under load, which strength members are able to be solidly connected to the two rigid elements to be joined respectively, a cross-brace body made of elastomer connecting together the two strength members and forming, at least partially, with the latter two fluid-tight chambers which are deformable in opposite directions senses when one of the two strength members moves with respect to the other in a diametral direction E, a restricted passage causing the two chambers to be permanently in communication with each other, a liquid mass filling the two chambers and the restricted passage, a rigid movable member delimiting in part at least one of the two chambers and mounted in such a manner as to be able to move with a limited amplitude.

As is known with such a coupler:

when oscillations of relatively large amplitude (namely greater than 0.5 mm) and of relatively low frequency (namely of the order of 5 to 15 Hz), such as those due to the "chopping" generated on the vehicle by the jolts from the road, are applied in the direction E to one of the two strength members, the liquid of one of the two chambers is displaced into the other one, and vice-versa, through the restricted passage, setting into resonance the liquid mass thus displaced when the frequency of said oscillations reaches a predetermined value which is a function of the ratio between the axial length and the cross-section of the restricted passage, this setting into resonance ensuring an excellent damping of the oscillations in question, when vibrations of relatively small amplitude (less than 0.5 mm) and of relatively high frequency (generally between 20 and 200 Hz), such as those due to the operation of a vehicle engine, are applied to one of the two strength members the movable member is the seat of vibrations capable of attenuating or filtering the transmission of the vibrations concerned.

In known embodiments of the couplers of the type in question, the movable member is generally free to move between its two stops and it is therefore the vibrations to which it is naturally subjected as a function of the vibrations to be damped which are exploited in order to achieve the desired attenuation.

In order to reinforce this attenuating or filtering effect, it has already been contemplated to suppress the "natural" character of the useful and exploitable vibrations of the movable member by modifying them in an artificial and forced manner, a method sometimes referred to under the name of "active attenuation".

For this purpose it has been proposed that the movable member is constituted by, at least partially, a ferromagnetic element, to apply "counter-vibrations" to this element with the help of electrical coils that is to say alternating forces of the same frequency as the vibrations to be reduced and which are oriented in the same direction as these vibrations and of reverse sense and to take a certain number of measures in order to permit stringent control of the controlled displacements of the flap and especially to prevent the latter from coming into contact with its stops when one of the two component strength members of the coupler is subjected to oscillations of low frequency and large amplitude.

These measures are in particular the following:

the movable member is guided by at least one deformable ring so as to move only in translation in the direction E of the vibrations to which it is subjected, spaces or air-gaps between the movable member and the coils are separated from the damping liquid by at least one fluid-tight annular seal, and provision is made for an electronic system acting as servo-control the electric excitation of the coils to the movements of the movable member itself such that the excitation due to this single system has the effect of reducing, which includes cancelling, these movements, said system comprising for this purpose a sensor of said movements arranged in the immediate proximity of said movable member (French Patent Application No. 90 01075, corresponding to U.S. application Ser. No. 07/648,526, filed Jan. 30, 1991, now U.S. Pat. No. 5,116,029, issued May 26, 1992).

SUMMARY OF THE INVENTION

The couplers to which the invention relates are intended for damping the transfer, to one of the two tubular strength members, of the oscillations or vibrations applied to the other strength member, not only in a single diametral direction E, but in one or the other of two separate diametral directions, namely the direction E and another diametral direction F, preferably perpendicular to the direction E.

For this purpose, the couplers of the type in question according to the invention also apply the various arrangements explained hereinabove, with the exception of the guiding of the movable member in a single given diametral direction, wherein the movable member of these couplers is constituted by a ring of revolution mounted so as to move freely in all transverse directions, but not axially, along one of the two tubular strength members, referred to hereinbelow as first strength member, from which it is radially separated by the air-gap, in this case cylindrical, wherein at least three fluid-tight chambers are formed between the cross-brace body made of elastomer and the ring, which chambers are circularly distributed around the axis of the second strength member and connected together by restricted passages in such a manner that there are observed alternating displacements of liquid in at least one such passage for each of 2 separate diametral working directions E and F and wherein the poles of the electrical coils are circumferentially distributed over the face of the first strength member, which delimits in part the air-gap such that the excitation of some of these coils has the effect of imposing on the ring to and fro movements in the direction E with respect to the first strength member and such that the excitation of the other coils has the effect of imposing on said ring to and fro movements in the direction F with respect to the first strength member.

In preferred embodiments, recourse is further made to one and/or the other of the following arrangements:

the first tubular strength member is the external strength member, the number of fluid-tight chambers is equal to 4, angularly distributed at 90° about the axis of the second strength member, in a coupler according to the preceding paragraph, the restricted passages connect in pairs the diametrically opposed chambers, respectively, in a coupler according to the paragraph which precedes the preceding one, the restricted passages connect in pairs the angularly contiguous chambers and are located between the cross-brace body made of elastomer and the face opposite the ring:

the polar piece in which the poles are created is constituted by an axial stack of identical washers made of ferromagnetic material and which are toothed on the inside, the ring comprises an axial stacking of identical ferromagnetic washers, which stack is itself clad, with the exception of its annular face contiguous with the air-gap, with a rigid body made of non-magnetic material, the fluid-tightness between the ring and the transverse plane faces opposite its guide is ensured with the aid of annular seals having for an axis the axis of the ring and housed in annular grooves hollowed out in the frontal faces of this ring.

With regard to assemblies equipped with couplers defined hereinabove, according to the invention, they essentially comprise separate servo-control means enabling vibrations in both directions E and F to be actively attenuated, which means comprise sensors of the movements of the ring in these two directions, respectively, which sensors are arranged in the immediate proximity of this ring and systems servo-controlling, at least partially, the excitations of the coils in question to the detected movements in order to actively attenuate these movements.

Apart from these main arrangements, the invention comprises certain other arrangements which are preferably used at the same time and which will be made more explicit hereinbelow.

BRIEF DESCRIPTION OF THE DRAWING

In the following, several preferred embodiments of the invention will be described by referring to the drawings herein attached in a non-limiting manner, of course.

FIGS. 1 and 2 of these drawings show, respectively, in transverse cross-section along I—I, FIG. 2, and in axial cross-section along II—II, FIG. 1, a hydraulic vibration-free coupler established according to the invention.

DETAILED DESCRIPTION OF THE PRIOR ART

Figure 4:
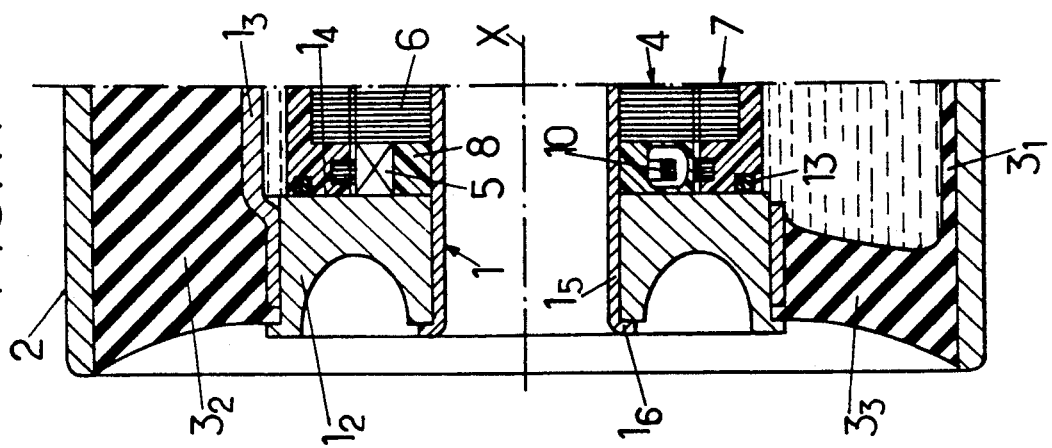
FIG. 4 shows in a similar way to FIG. 2 an alternative form of a hydraulic vibration-free coupler according to the invention.

The coupler or mount shown in FIGS. 1 and 2 comprises:

a central rigid tubular strength member or frame 1 having an axis X, a tubular rigid strength member or frame 2 surrounding the strength member 1 and which, at least under load, is coaxial with the strength member 1, and a cross-brace body 3 made of elastomer connecting together the two strength members 1 and 2 and being adhesively bonded to each of them.

The central or internal tubular strength member 1 is constituted by a simple metallic tube section.

The encasing or external strength member 2 comprises:

an annular body 2 constituted preferably from a light alloy, which body is itself composed of two collars $2_2$ having a square axial half-section and of an inner cage $2_3$ surrounded contiguously at its extremities by the collars and comprising four longitudinal bars or connecting straps, the two collars defining between them an annular housing delimited axially by two transverse plane faces $2_4$, and a cylindrical holder $2_5$ contiguously covering the two collars $2_2$.

The body 3 made of elastomer has:

a thin sheath $3_1$ attached around the internal tubular strength member 1, four radial flat partitions $3_2$ inclined at 90° to each other about the axis X and each being extended between the sheath $3_1$ and one of the connecting straps $2_3$, and two terminal transverse partitions $3_3$ in the form of slightly inclined disks or truncated cones each connecting one axial extremity of the internal tubular strength member 1 to one of the two collars $2_2$.

Considering the transverse plane of FIG. 1, it will be used to denote in the following E and F the directions of the bisectors of the angles defined by the intersections, with said plane, of the median planes of the partitions $3_2$: as these partitions $3_2$ are in this case perpendicular to each other, this also applies to directions E and F.

In the annular housing delimited on the outside by the holder $2_5$ and axially by the faces $2_4$, there are arranged:

on the one hand, juxtaposed on the outside against said holder and axially against the collars $2_2$, a fixed polar part 4 comprising a ring arrangement of electrical coils 5 each surrounding a core 6 forming a magnetic pole radially oriented toward the axis X, and, on the other hand, a movable member in the form of a magnetic ring (or sheath) 7 arranged on the inside of the polar piece 4 in such a way as to be able to move freely with respect to this part along all possible transverse radial directions, but not axially.

The mean value of the radial play or air-gap e between the ring 7 and the polar piece 4 which surrounds it is generally between 0.1 and 1 mm.

The guiding of the transverse move freely of the ring 7 is ensured by contiguous sliding of the frontal faces of the latter against the opposite faces $2_4$ of the collars $2_2$.

The extremities $2_6$ of the holder $2_5$ are folded back inwardly over the edges of the collars $2_2$ in such a way as to assemble by a crimping effect the assembly of the axially juxtaposed fixed parts $2_2$ and 4.

In the preferred embodiment illustrated, the polar piece 4 comprises in its axial median zone a stack of washers made of magnetic material which are toothed on the inside, and it is the stacks of teeth which form the cores 6 surrounded by the coils 5: the lamination thus obtained reduces the magnetic losses.

The magnetic stack is itself bordered axially by two annular parts 8 made of plastic which are juxtaposed against the collars $2_2$ along their faces $2_4$.

With regard to the ring 7, it also comprises a laminated magnetic central zone, that is to say composed of an axial stack of washers $7_1$ made of magnetic material, which stack is clad on all sides, except on its outer face delimiting the play e constituting the air-gap, by an annular body $7_2$ made of rigid plastic.

The inner cylindrical face of the ring 7, together with the component partitions $3_2$ of the body 3 made of elastomer, defines four chambers or bags A, B, C and D angularly offset with each other by 90° about the axis X.

These bags communicate with each other from one to the next by means of restricted channels 9 which are reserved between the connecting straps $2_3$ and the inner face of the ring 7.

The various bags A, B, C, D as well as the restricted passages 9 which connect them are filled with a damper liquid.

There may also be seen in the figures four sensors 10, 10', 11 and 11' solidly connected to the polar part 4 which are specifically for detecting the movements of the ring 7 along the two directions E and F, respectively.

For this purpose these sensors are in this case disposed in one of the annular parts 8, in portions of these parts, which are contiguous with the air-gap e and in diametrically opposed pairs along the directions E and F, the two sensors 10, 10' being assigned to the direction E and the two sensors 11, 11' to the direction F.

The fluid-tightness of the air gap e relative to the fluid is ensured with the aid of annular gaskets 12 housed in annular grooves 13 hollowed out in the frontal faces of the annular body $7_2$, respectively: in this way, said gaskets 12 bear against the faces $2_4$ of the collars $2_2$.

In the embodiments to which the invention is preferably applicable and which are chosen by way of nonlimiting examples for the present specification, one of the two strength members 1 and 2 is mounted on the chassis of a vehicle and the other is linked to one of the suspension axles of this vehicle or to the internal combustion engine of the latter.

The oscillations of relatively low frequency and large amplitude which are applied to one of the strength members 1 and 2 along the direction E result in an alternating displacement at the same frequency of the liquid contained in the bag A toward the bag C, through the bags B and D and the restricted passages 9, and vice-versa, and the oscillating columns of liquid contained in said passages are the seat of resonance phenomena when said frequency reaches a predetermined value which depends on the dimensions of said passage, this phenomenon having the effect of damping the transmission of the oscillations arising from one strength member to the other.

If the oscillations applied to one of the strength members in relation to the other have a relatively high frequency and a relatively low amplitude, thus resembling vibrations, the transmission of these vibrations between the two strength members is absorbed or damped, at least partially, by setting the ring 7 into natural vibration.

It is vibrations of this type which the document mentioned hereinabove proposes to control artificially by means of electrical actuation.

However, in this document the natural vibrations of the movable member which in this case took the place of a ring occurred along a single direction and this also applied to counter-vibrations artificially applied to this movable member.

In the present case, the ring 7 may be set into natural vibration along one or both of the two directions E and F and the electrical control means provided enable artificial vibrations to be imparted to said ring along one or both of these two directions E and F.

For this purpose, the control means are doubled with respect to the preceding ones and comprise two similar servo systems each assigned to one of the two directions E and F and each exploiting the information arising from one of the two pairs of movement sensors 10, 10' or 11, 11'.

In the embodiment shown diagrammatically in FIG. 1, the coils 5 are eight in number, uniformly distributed around the axis X, so that each sensor is angularly flanked by two coils, namely, respectively:

the two coils $5_E$ for the sensor 10,
the two coils $5'_E$ for the sensor 10',
the two coils $5_F$ for the sensor 11,
and the two coils $5_F$ for the sensor 11'.

It should be noted that the magnetic forces applied to the ring 7 by the two coils which flank a given sensor have a resultant force oriented along the direction E or F to which this sensor is assigned.

It should also be noted that any force oriented transversely, that is to say in a plane perpendicular to the axis X, but along a different direction to the directions E and F, may be considered as the resultant of two components oriented along these two directions E and F respectively.

Consequently, the control of the vibrations along the two directions E and F permits a control of all the vibrations generated along other transverse directions.

Figure 3:
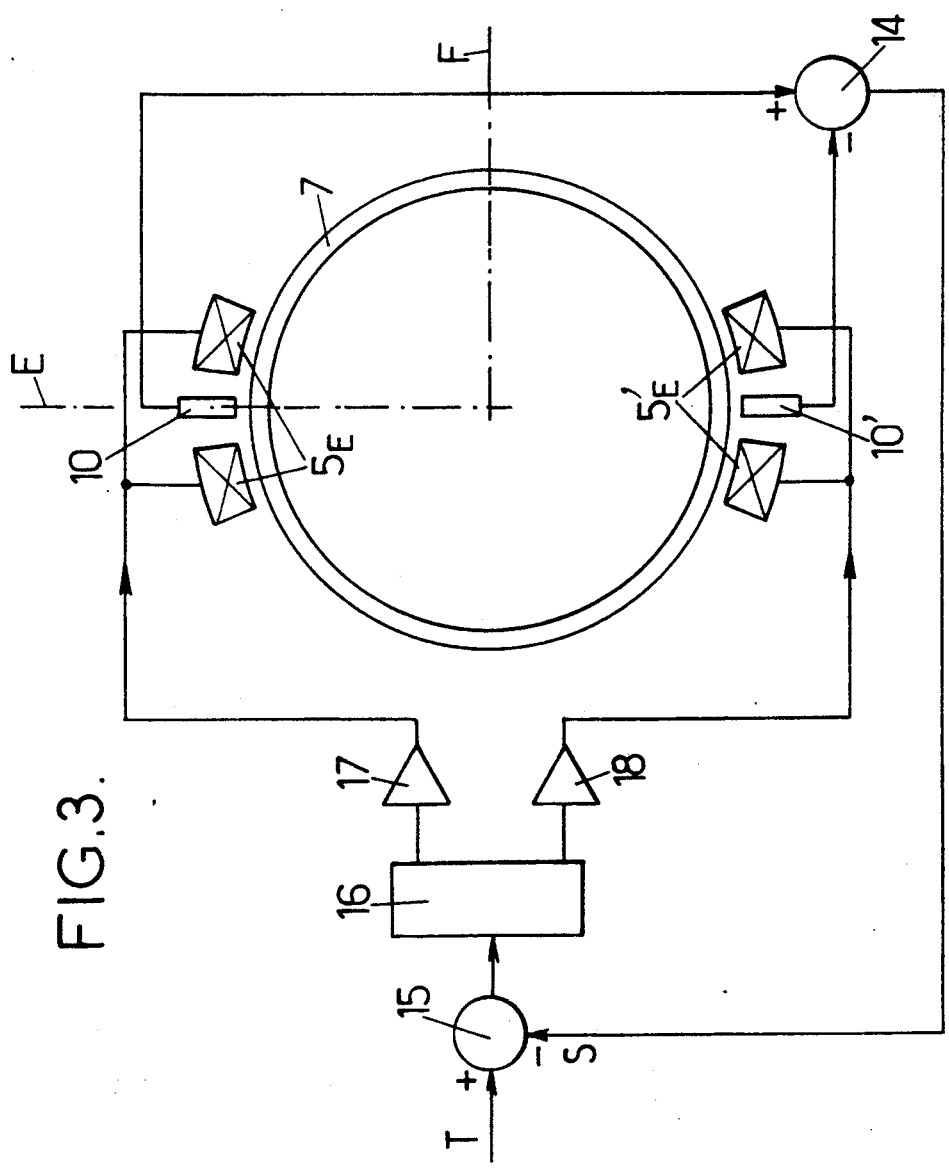
FIG. 3 shows diagrammatically a portion of an assembly established according to the invention for actuating such a coupler.

As the two servo-control systems respectively assigned to the two directions E and F are similar, it is sufficient to describe one of them here and this will be made by reference to FIG. 3.

The system in question comprises, in addition to the pairs of coils $5_E$ and $5'_E$ together with the sensors 10 and 10' of the movements of the ring 7 along the direction E:

a subtracting circuit 14 supplied by the outputs of the two sensors 10 and 10' and therefore capable of processing a signal S representative of the movements of the ring 7 along the direction E, a second subtracting circuit 15 suitable for receiving, on the one hand, the signal S and, on the other hand, an external correcting signal T, an electronic circuit 16 for processing the data emitted by the subtracting circuit 15, and two amplifiers 17 and 18 interposed respectively between the circuit 16 and each pair of coils $5_E$ and $5'_E$.

The correcting signal T is generated in external circuits which do not form part of the present invention and which take into account especially actual vibrations to which the two tubular strength members 1 and 2 are subjected and possibly the instantaneous frequency of the vibrations of the engine of the vehicle equipped with the coupler in question.

The servo-control produced by the system is generally provided in such a manner that if it is utilized in isolation, it virtually immobilizes the ring 7, any attempt by the latter to move in a given direction resulting instantaneously in the application to it of a reverse opposing force tending to prohibit this movement.

It is to the ring thus servo-controlled in position that it is advantageous to apply artificially correcting vibrations or "counter-vibrations".

The characteristics (frequency, amplitude, phase) of these counter-vibrations may be identical to those of the natural vibrations of the ring which would take place in the absence of any servo-control.

In this case damping effects are obtained of the same type as those obtained by said natural vibrations.

But here these vibrations are imposed on the ring 7 whilst holding the latter away from its stops so that it no longer risks coming up against these stops, the amplitude of said vibrations always being less than the play of the movable member movements, that is to say less than the thickness of the air-gap e the amplitude of the vibrations in question is for example of the order of 0.1 mm if said thickness is of the order of 0.5 mm.

In particular, there is no longer any risk of the vibrations in question ceasing under possible oscillations of low frequency and large amplitude.

That said, the servo-control in question makes it possible to apply to the ring 7 vibrations which are even more corrective than the natural vibrations previously mentioned, in particular by imparting to these correcting vibrations amplitudes greater than those of said natural vibrations, but always less than the play defined hereinabove, of course.

The assembly makes it possible then to generate an "active attenuation" of the vibrations to be damped, which ultimately enables the latter to be completely suppressed in the region of the tubular strength member linked to the vehicle chassis.

The various coils 5 work in the manner of variable reluctance motors, generating on the ring large forces oriented alternately in two opposed directions.

The sensors 10, 10', 11, 11' are constituted in any desired manner, working for example on the LVDT ("Linear Variation Differential Transformer") principle or being of an inductive, capacitive or eddy-current type.

As a result of which, and regardless of the embodiment adopted, there is finally provided a hydraulic vibration-free coupler whose constitution, operation and advantages are sufficiently clear from what has been stated above.

As is apparent, and as moreover is already clear from the above, the invention is not at all limited to those of its applications and embodiments which have more especially been contemplated; on the contrary it embraces all the alternative forms thereof, especially:

those where the connections between the chambers A, B, C, D by means of the restricted passages 9 would be produced in such a way as to cause the diametrically opposed chambers (here A and C or B and D) to communicate with each other in pairs and not the angularly contiguous chambers as illustrated in FIG. 1, measures then being taken, of course, to ensure the fluid-tightness between the connecting straps $2_3$ and the ring 7 whilst allowing the vibrations of this ring, those where the number of chambers delimited between the body 3 made of elastomer and the internal face of the ring 7 would be other than four and especially equal to three, said chambers being especially, in this latter case, identical with each other and angularly offset by 120° about the axis X.

those where the annular gaskets ensuring the fluid-tightness of the air-gap e whilst allowing for the movements of the ring 7 will be housed in the collars $2_2$ instead of it being in said ring 7 itself, and those where the strength member along which the ring 7 would be transversely mounted for free movement in all transverse directions, but not axially, would be the internal strength member 1 instead of being the external strength member 2, as has been illustrated in FIG. 4, the electrical coils 5, which generate compensation forces, then being carried also by said internal strength member inside the ring 7 and the liquid chambers then being formed on the outside of this ring, the previous constructions of the two strength members 1 and 2 here being switched around in this sense that it is now the internal strength member 1 which is composed of two collars $1_2$ surrounded by the extremities of a cage $1_3$ and axially crimped against a central ring-arrangement of poles (4, 5, 6, 8) by folding over outwardly the edges $1_6$ of an inner holder $1_5$, the two collars $1_2$, still defining, axially between them, an annular housing delimited axially by two transverse plane faces $1_4$, for the ring 7.

I claim:

1. A hydraulic antivibratory coupler interposable between two rigid elements, comprising an outer rigid tubular strength member surrounding an inner rigid tubular strength member, each tubular strength member solidly connected one to each of the two rigid elements, respectively, an elastomeric cross-brace body connecting together the two strength members and forming, at least in part, at least three fluid-tight chambers, which chambers are circularly distributed around the axis of the inner tubular strength members, restricted passages causing the chambers to be permanently in communication with each other in such a manner that alternating displacements of liquid in at least one such passage exists for each of two separate diametral working directions, namely a direction E and another direction F, a damping liquid mass filling the chambers and the restricted passages, a rigid circular ring delimiting in part at least one of the chambers and mounted in such a manner as to be moveable along said diametral directions E and F with a limited amplitude, said ring being constituted, at least partially, by a ferromagnetic element, electrical coils for applying alternating forces to said ferromagnetic element, an air-gap between the ring and the coils, said air-gap being separated from the damping liquid by at least one fluid-tight annular seal, a sensor means for sensing movements of the ring, which sensor means is arranged in the immediate proximity of said ring, said ring being mounted so as to move freely in all transverse directions within a first one of the two tubular strength members, but not in an axial direction, said coils having poles circumferentially distributed over the face of the said first tubular strength member, which poles delimit in part the said air-gap in such a way that the excitation of some of said coils imposes on the ring transverse movements along the direction E with respect to the first tubular strength member and such that the excitation of the other coils imposes on said ring transverse movements along the direction F with respect to said first tubular strength member.

2. A coupler according to claim 1, wherein the first tubular strength member is the outer tubular strength member.

3. A coupler according to claim 2, including four fluid-tight chambers angularly distributed at 90° about the axis of the inner tubular strength member.

4. A coupler according to claim 3, wherein the restricted passages connect, in pairs, the diametrally opposed chambers, respectively.

5. A coupler according to claim 3, wherein the restricted passages connect, in pairs, the angularly contiguous chambers, said restricted passages being located between the cross-brace body and the ring.

6. A coupler according to claim 2, wherein the said poles are formed by a stack of identical washers extending transversely, and stacked in the axial direction, said washers being of ferromagnetic material and being toothed on the edge thereof facing towards the air-gap.

7. A coupler according to claim 2, wherein the ring comprises a stack of transversely extending, axially stacked identical ferromagnetic washers, which stack is surrounded by a cladding of non-magnetic material except on the annular face thereof contiguous with the air-gap.

8. A coupler according to claim 2, wherein the ring is slidably received in an annular housing space within the outer tubular strength member, and said annular seal comprises a pair of annular sealing rings mounted in grooves in the ring and sealingly engaging opposed faces of the annular housing space.

9. A damping assembly equipped with a coupler as set forth in claim 2, comprising a separate servo-control means enabling vibrations in each of the E and F directions to be actively attenuated, which servo-control means comprises said sensor means for sensing movement of the ring in the E and F directions, respectively, said sensor means being arranged in the intermediate proximity of said ring, and including a circuit means for at least partially controlling excitations of the said coils in response to the detected movements of the ring in order to actively attenuate there movements.

10. A coupler according to claim 1, wherein the first tubular member is the inner tubular strength member.

11. A coupler according to claim 10, including four fluid-tight chambers angularly distributed at 90° about the axis of the inner tubular strength member.

12. A coupler according to claim 11, wherein the restricted passages connect, in pairs, the diametrally opposed chambers, respectively.

13. A coupler according to claim 11, wherein the restricted passages connect, in pairs, the angularly contiguous chambers, said restricted passages being located between the cross-brace body and the ring.

14. A coupler according to claim 10, wherein the said poles are formed by a stack of identical washers extending transversely, and stacked in the axial direction, said washers being of ferromagnetic material and being toothed on the edge thereof facing towards the air-gap.

15. A coupler according to claim 10, wherein the ring comprises a stack of transversely extending, axially stacked identical ferromagnetic washers, which stack is surrounded by a cladding of non-magnetic material except on the annular face thereof contiguous with the air-gap.

16. A coupler according to claim 10, wherein the ring is slidably received in an annular housing space within the inner tubular strength member, and said annular seal comprises a pair of annular sealing rings mounted in grooves in the ring and sealingly engaging opposed faces of the annular housing space.

17. A damping assembly equipped with a coupler as set forth in claim 10, comprising a separate servo-control means enabling vibrations in each of the E and F directions to be actively attenuated, which servo-control means comprises said sensor means for sensing movement of the ring in the E and F directions, respectively, said sensor means being arranged in the intermediate proximity of said ring, and including a circuit means for at least partially controlling excitations of the said coils in response to the detected movements of the ring in order to actively attenuate these movements.

* * * * *